US012682442B2

(12) United States Patent

Hirai et al.

(10) Patent No.: US 12,682,442 B2

(45) Date of Patent: Jul. 14, 2026

(54) INSPECTION SYSTEM FOR DETECTING FOREIGN MATERIAL AND SCRATCH AT EDGE OF SEMICONDUCTOR WAFER AND NON-TRANSITORY COMPUTER-READABLE MEDIUM STORING A PROGRAM FOR SAME

(71) Applicant: Hitachi High-Tech Corporation, Tokyo (JP)

(72) Inventors: Takehiro Hirai, Tokyo (JP); Yohei Minekawa, Tokyo (JP); Satoshi Takada, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 357 days.

(21) Appl. No.: 17/769,557

(22) PCT Filed: Sep. 4, 2020

(86) PCT No.: PCT/JP2020/033626

§ 371 (c)(1),
(2) Date: Apr. 15, 2022

(87) PCT Pub. No.: WO2021/075170

PCT Pub. Date: Apr. 22, 2021

(65) Prior Publication Data

US 2024/0127417 A1 Apr. 18, 2024

(30) Foreign Application Priority Data

Oct. 18, 2019 (JP) .................................. 2019-190910

(51) Int. Cl.
*G06T 7/00* (2017.01)
*G01N 23/223* (2006.01)

(52) U.S. Cl.
CPC ......... *G06T 7/0004* (2013.01); *G01N 23/223* (2013.01); *G01N 2223/6116* (2013.01);
(Continued)

(58) Field of Classification Search
None
See application file for complete search history.

(56) References Cited

U.S. PATENT DOCUMENTS 7,919,760 B2 4/2011 Jau et al.
2001/0048522 A1* 12/2001 Yonezawa .............. G01N 21/88
356/237.2

(Continued)

FOREIGN PATENT DOCUMENTS

CN 101796399 A 8/2010
JP 8-201317 A 8/1996
(Continued)

OTHER PUBLICATIONS

Google patent translation of JP2009218570, originally filed on Dec. 26, 2008, first published on Sep. 24, 2009, English translation available on Google Patents, Available online: https://patents.google.com/patent/JP2009218570A/en?oq=JP2009218570 (Year: 2009).*
(Continued)

*Primary Examiner* — Tahmina N Ansari
(74) *Attorney, Agent, or Firm* — Crowell & Moring LLP

(57) ABSTRACT

The present disclosure proposes a system for detecting a foreign material adhering to or a scratch formed on a bevel at an edge of a semiconductor wafer in order to detect the foreign material or defect on the bevel without using a reference image and including a learning device (905) that outputs information on the foreign material adhering to or the scratch formed on the bevel as a learning result, in which the learning device performs learning in advance by using image data acquired by an image acquisition tool and the (Continued)

information on the foreign material or the scratch on the bevel included in the image data, and the foreign material or the scratch is detected by inputting the image data obtained by the image acquisition tool to the learning device (refer to FIG. 9).

6 Claims, 17 Drawing Sheets

(52) U.S. Cl.
CPC ................. *G01N 2223/646* (2013.01); *G06T 2207/10061* (2013.01); *G06T 2207/10116* (2013.01); *G06T 2207/20081* (2013.01); *G06T 2207/30148* (2013.01)

(56) References Cited

U.S. PATENT DOCUMENTS

| | | | | |
|---|---|---|---|---|
| 2003/0191732 | A1* | 10/2003 | Lee ........................ | G06N 5/025 |
| | | | | 706/61 |
| 2004/0126909 | A1 | 7/2004 | Obara et al. | |
| 2010/0140498 | A1 | 6/2010 | Jau et al. | |
| 2011/0064297 | A1 | 3/2011 | Sakaguchi et al. | |
| 2016/0116425 | A1 | 4/2016 | Sinha et al. | |
| 2019/0006208 | A1* | 1/2019 | Maki .................... | H05B 1/0233 |
| 2019/0304826 | A1* | 10/2019 | Liu .................... | G01N 21/9505 |
| 2022/0130027 | A1* | 4/2022 | Fukuda .................. | H01L 22/12 |
| 2024/0118508 | A1* | 4/2024 | Pfister ..................... | G02B 6/43 |
| 2024/0127417 | A1* | 4/2024 | Hirai .................... | G01N 23/223 |

FOREIGN PATENT DOCUMENTS

| | | | |
|---|---|---|---|
| JP | 2001-343336 | A | 12/2001 |
| JP | 2004-191187 | A | 7/2004 |
| JP | 2009-63493 | A | 3/2009 |
| JP | 2009218570 | A | 9/2009 |
| JP | 2014-67863 | A | 4/2014 |
| JP | 5608208 | B2 | 10/2014 |
| JP | 2015-36719 | A | 2/2015 |
| JP | 2017-532564 | A | 11/2017 |
| JP | 2018-48951 | A | 3/2018 |
| JP | 2019-109563 | A | 7/2019 |
| JP | 2020009435 | A | 1/2020 |
| TW | 201908719 | A | 3/2019 |
| WO | WO-2021030833 | A1 * | 2/2021 |

OTHER PUBLICATIONS

Japanese-language Office Action issued in Japanese Application No. 2021-552266 dated May 9, 2023 (4 pages).
International Search Report (PCT/ISA/210) issued in PCT Application No. PCT/JP2020/033626 dated Nov. 17, 2020 with English translation (nine (9) pages).
Japanese-language Written Opinion (PCT/ISA/237) issued in PCT Application No. PCT/JP2020/033626 dated Nov. 17, 2020 (six (6) pages).
Taiwanese-language Office Action issued in Taiwanese Application No. 109133303 dated Aug. 20, 2021 (13 pages).
Japanese Office Action to corresponding JP Appl. No. 2023-186099 issued Nov. 26, 2024 (6 pages).
Chinese-language Office Action issued in Chinese Application No. 202080072235.5 dated Sep. 19, 2025 (9 pages).

* cited by examiner

[FIG. 1]
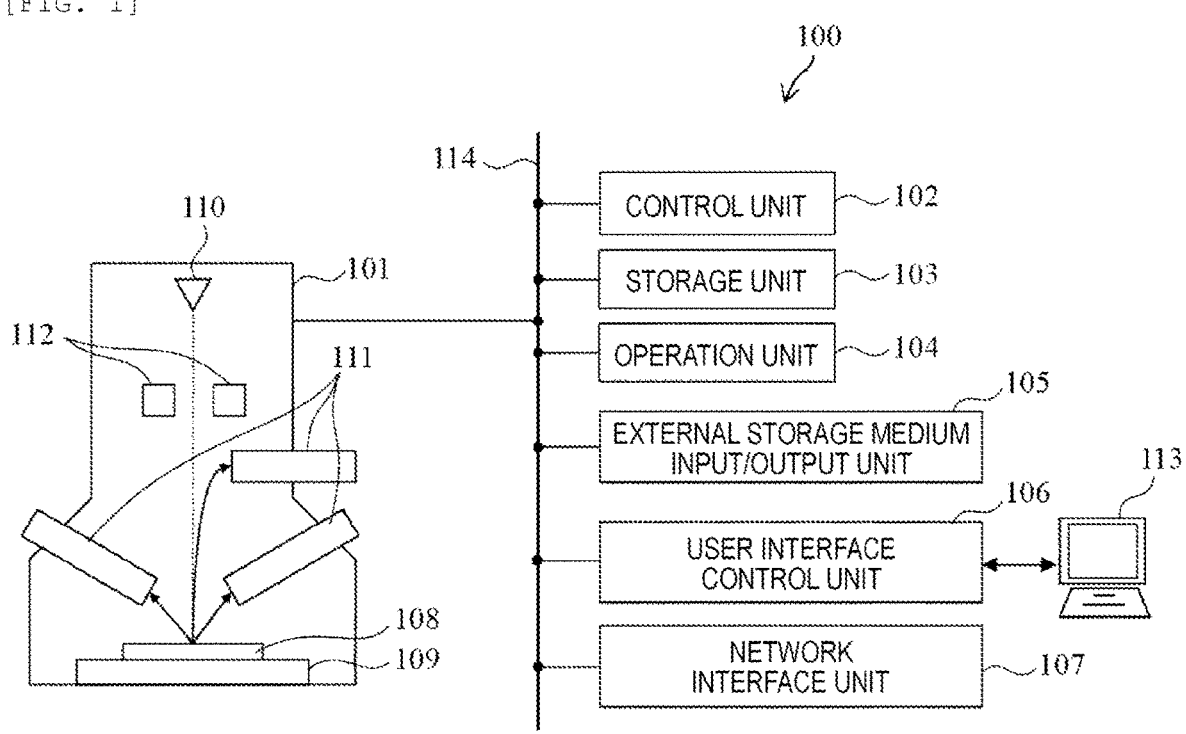

[FIG. 2]
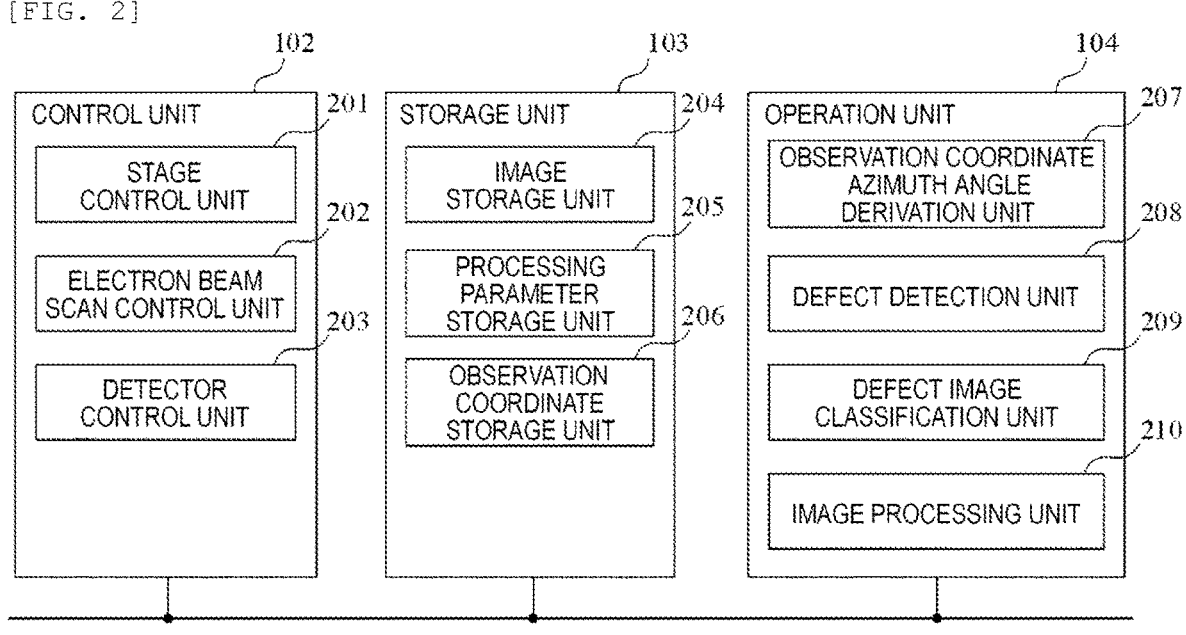

FIG. 4A
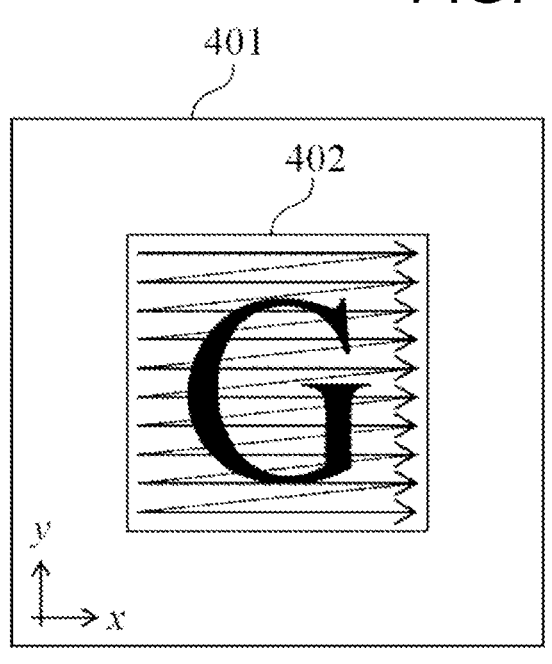
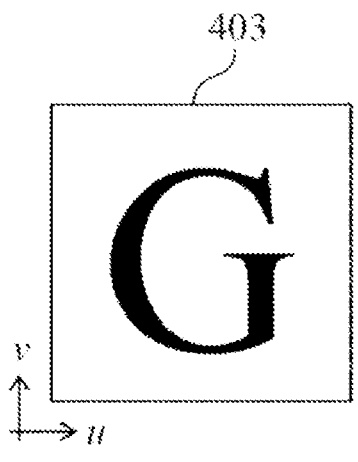
FIG. 4B
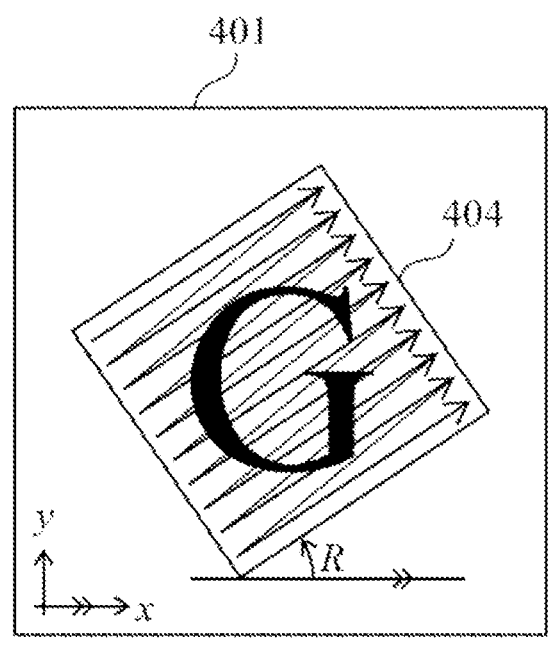
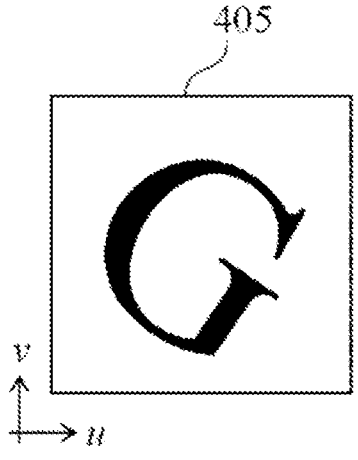

[FIG. 5]
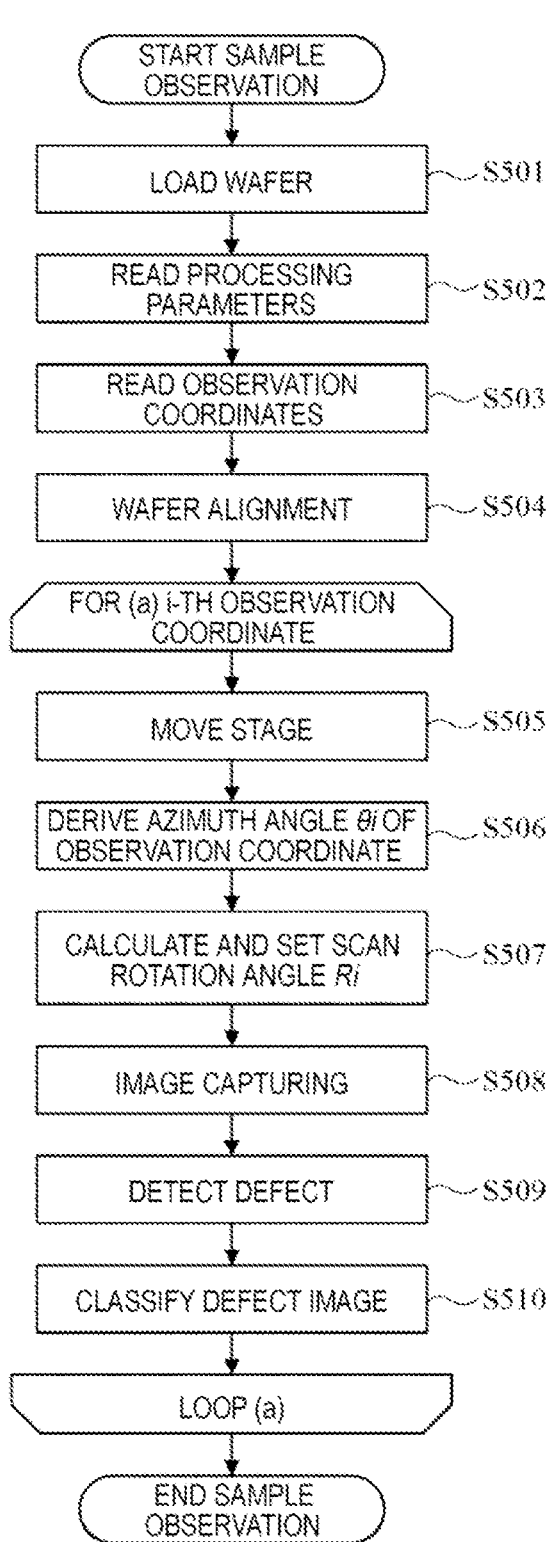

[FIG. 6]
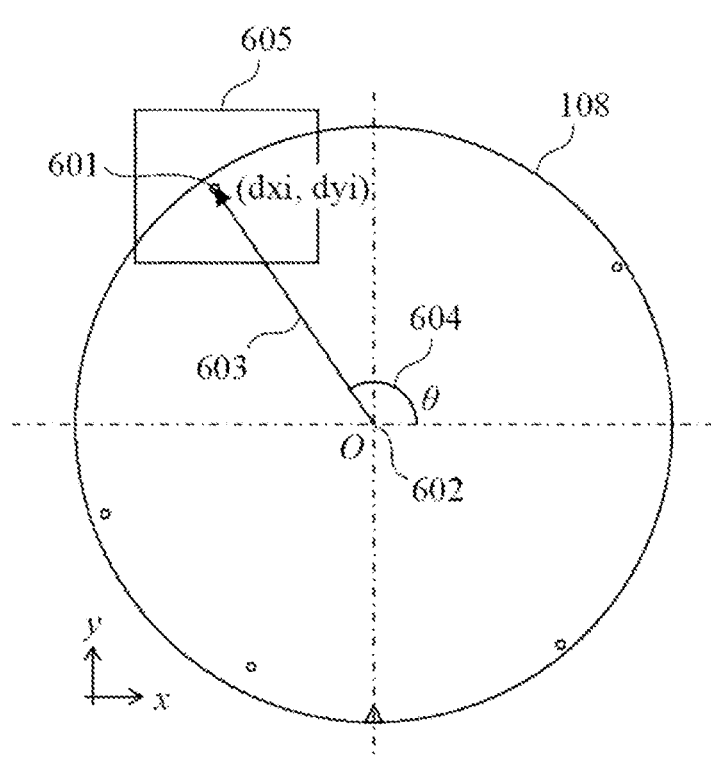
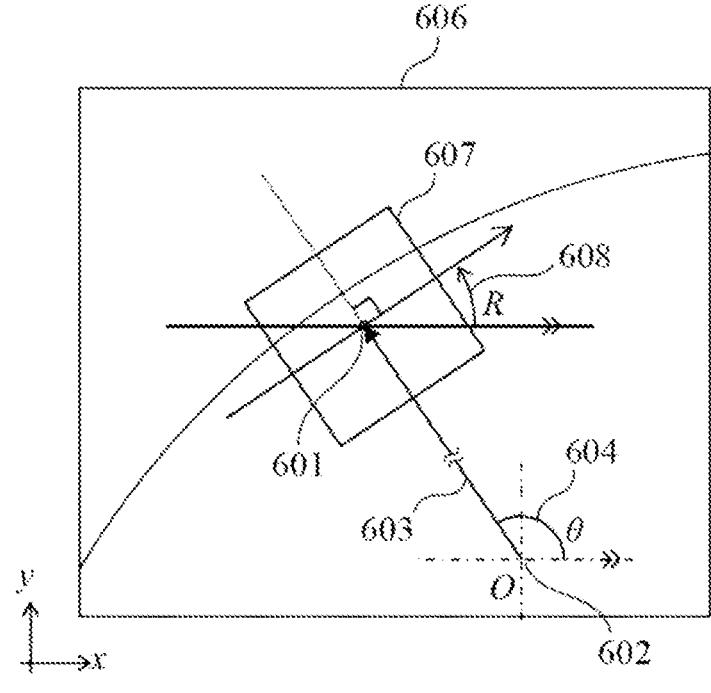

[FIG. 7]
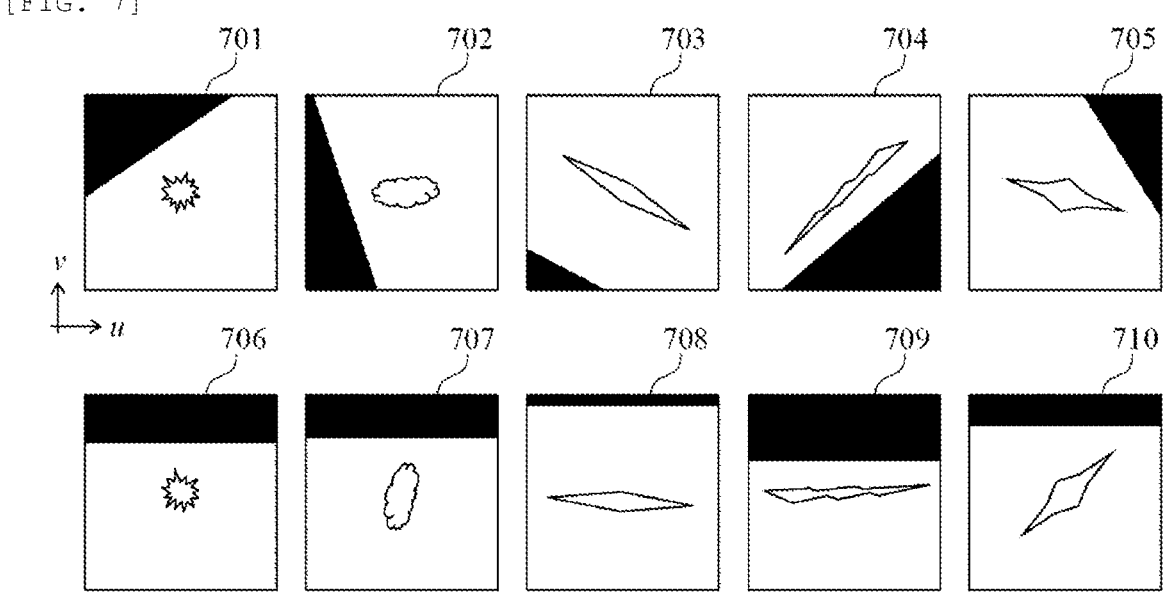

[FIG. 8]
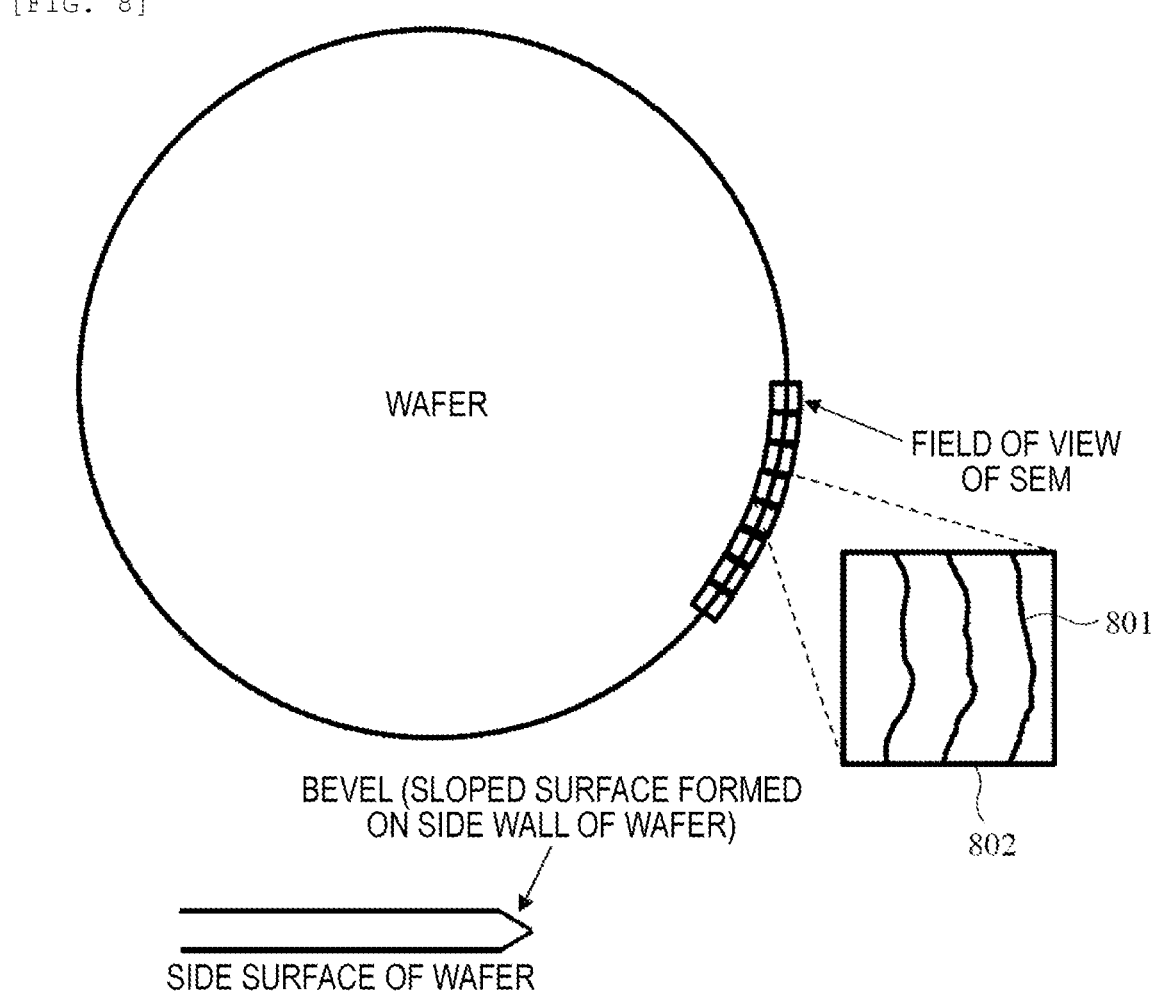

[FIG. 9]
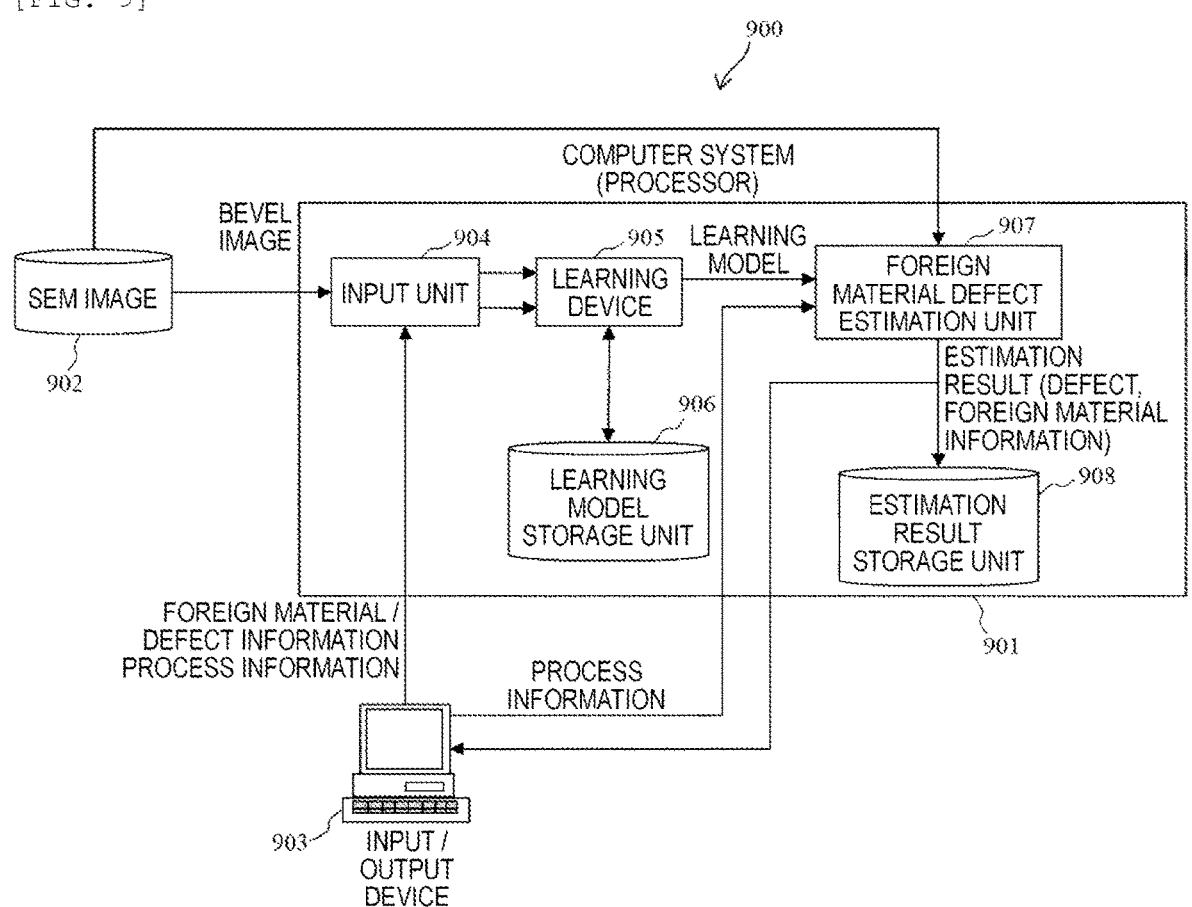

[FIG. 10]
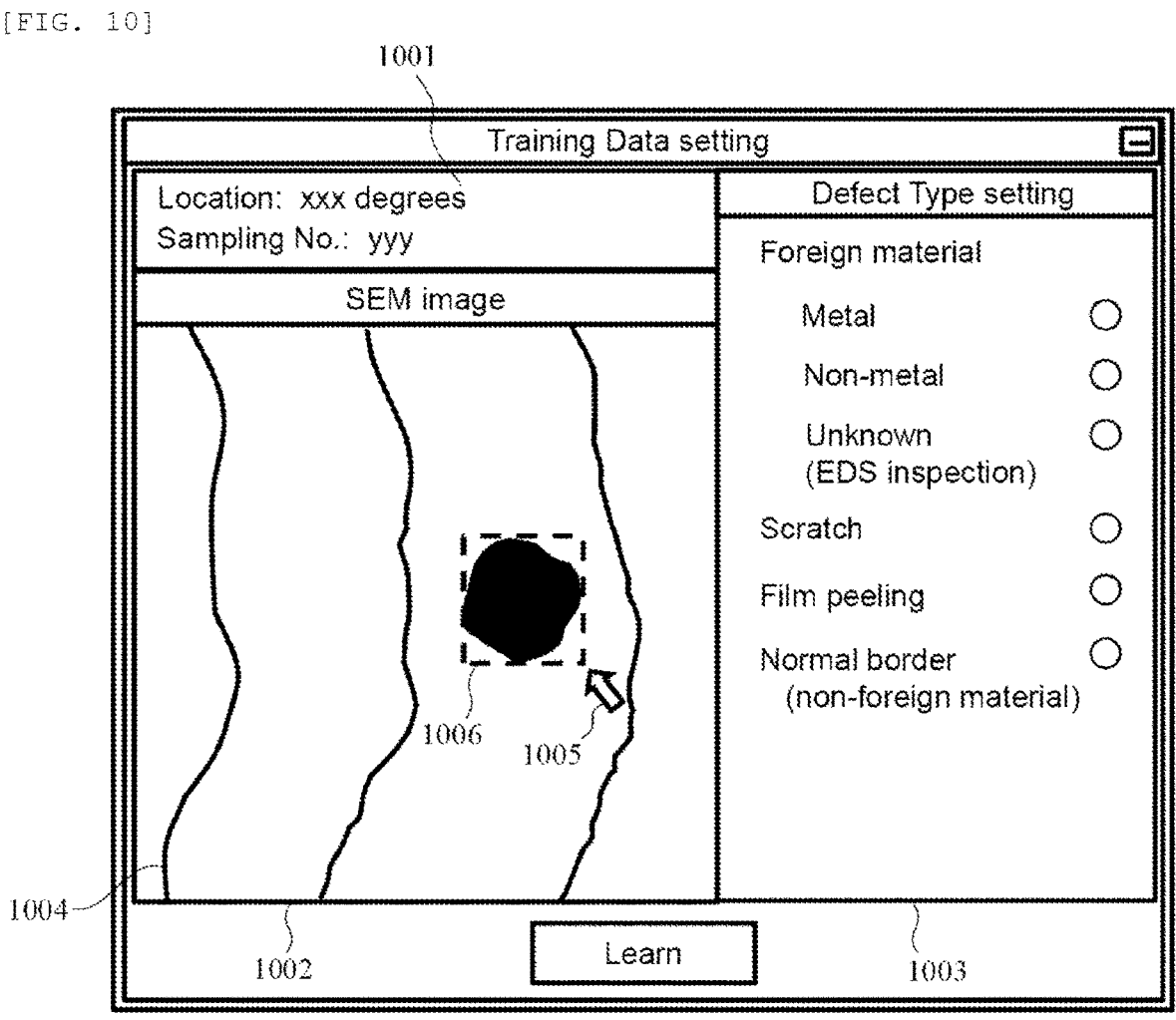

[FIG. 11]

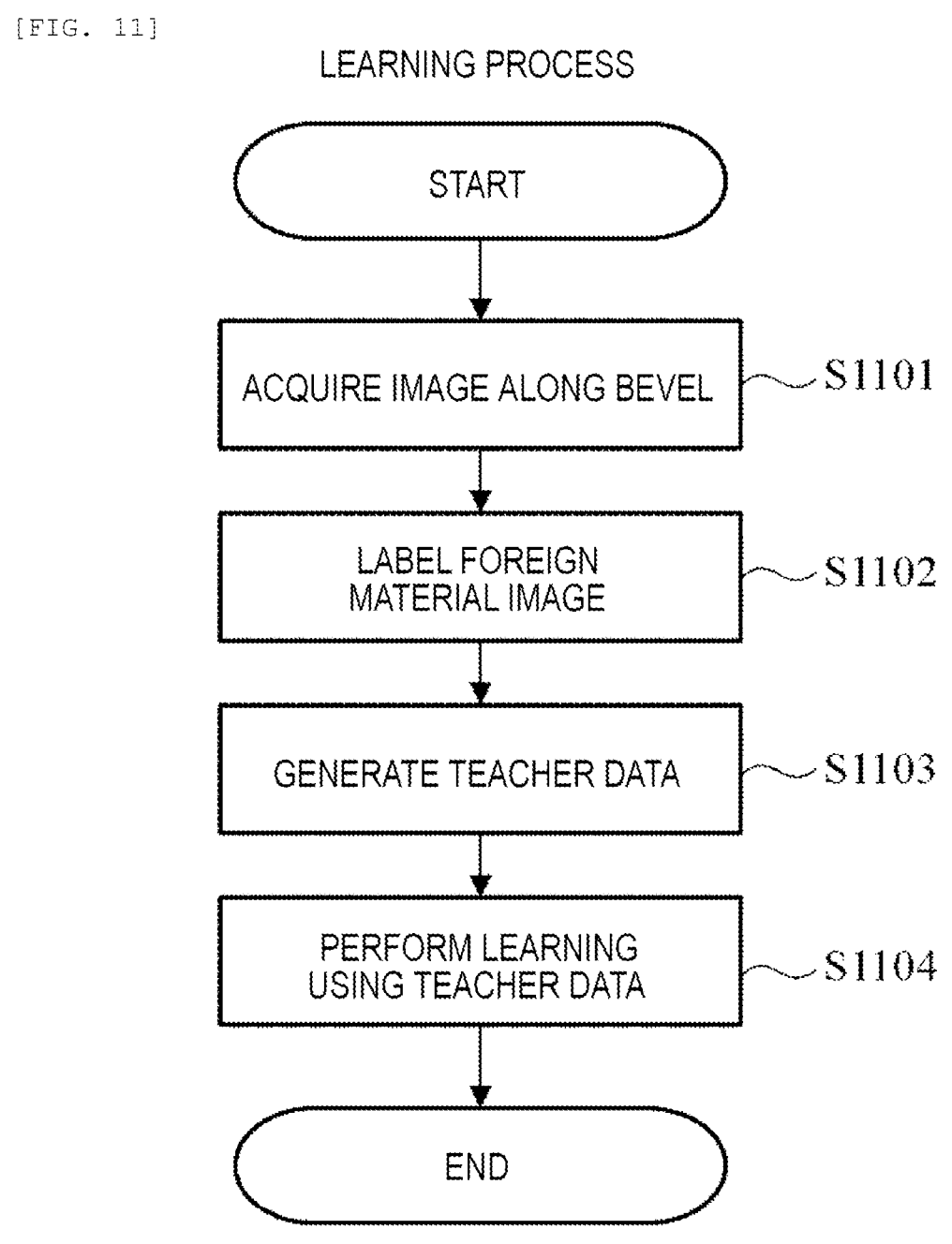

LEARNING PROCESS

START

ACQUIRE IMAGE ALONG BEVEL — S1101

LABEL FOREIGN MATERIAL IMAGE — S1102

GENERATE TEACHER DATA — S1103

PERFORM LEARNING USING TEACHER DATA — S1104

END

[FIG. 12]
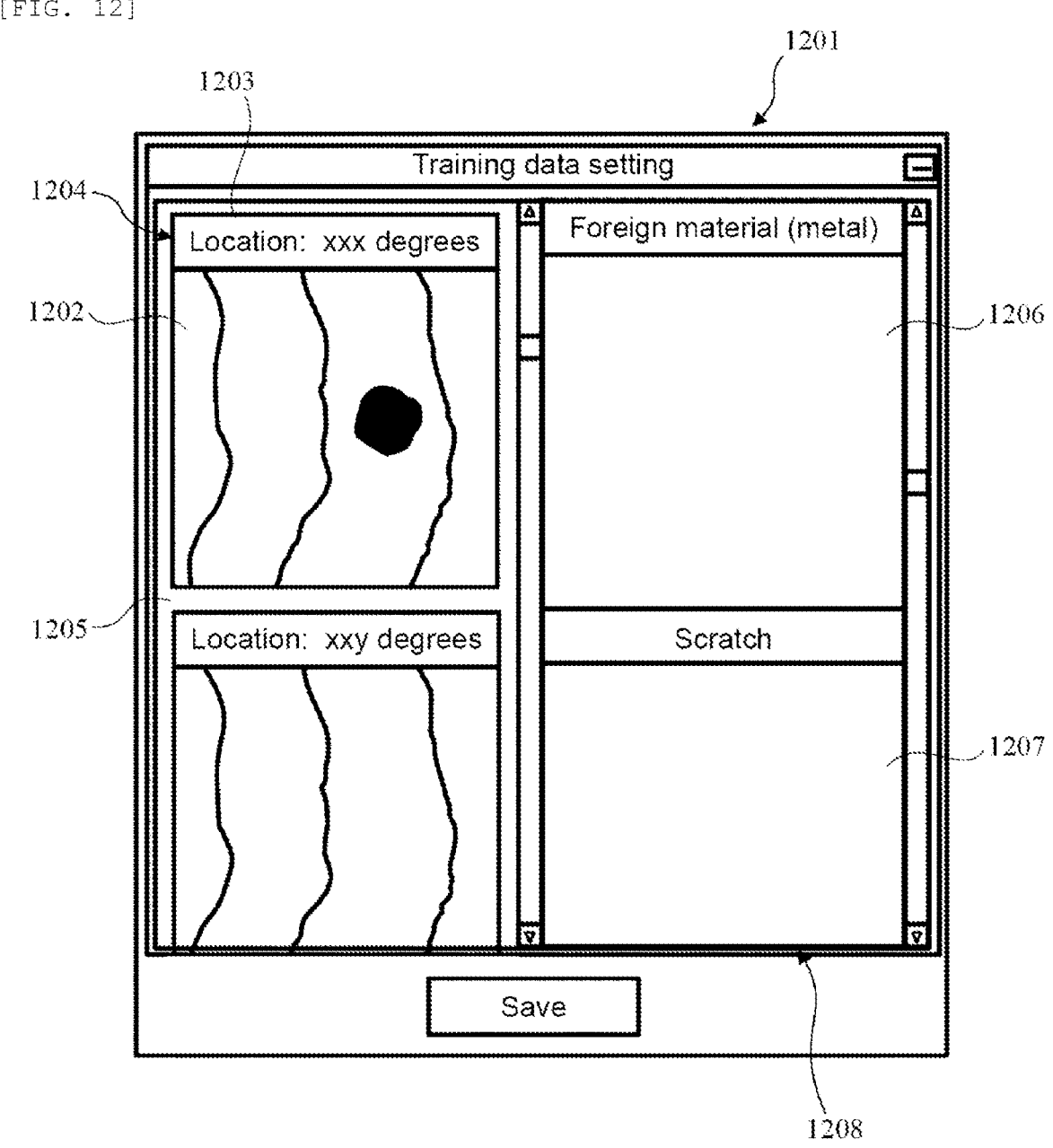

[FIG. 13]
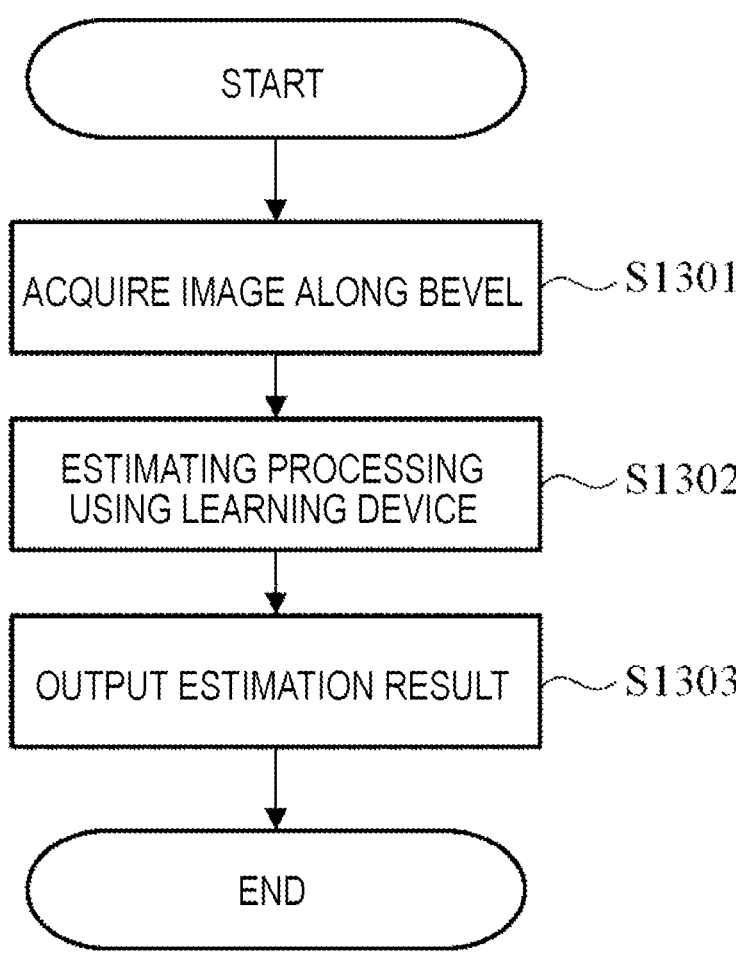

[FIG. 14]
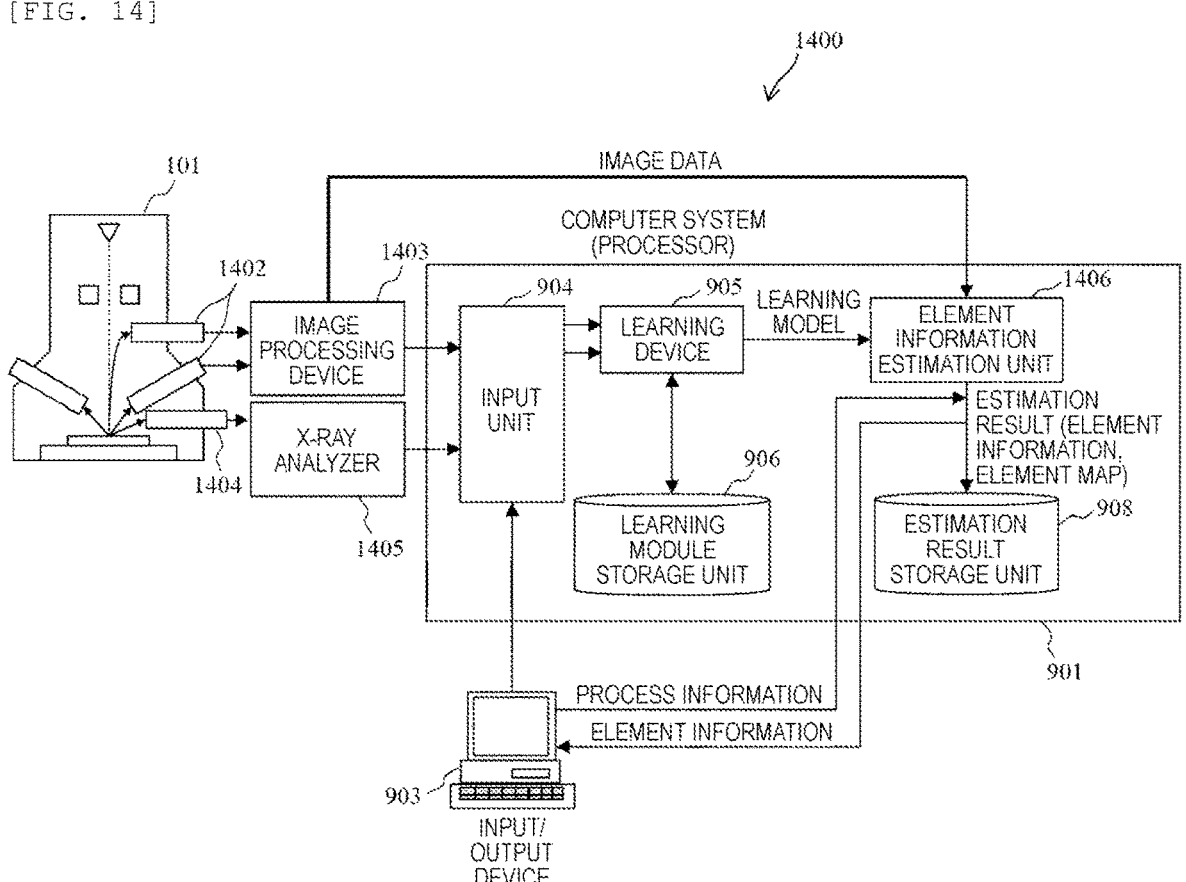

[FIG. 15]

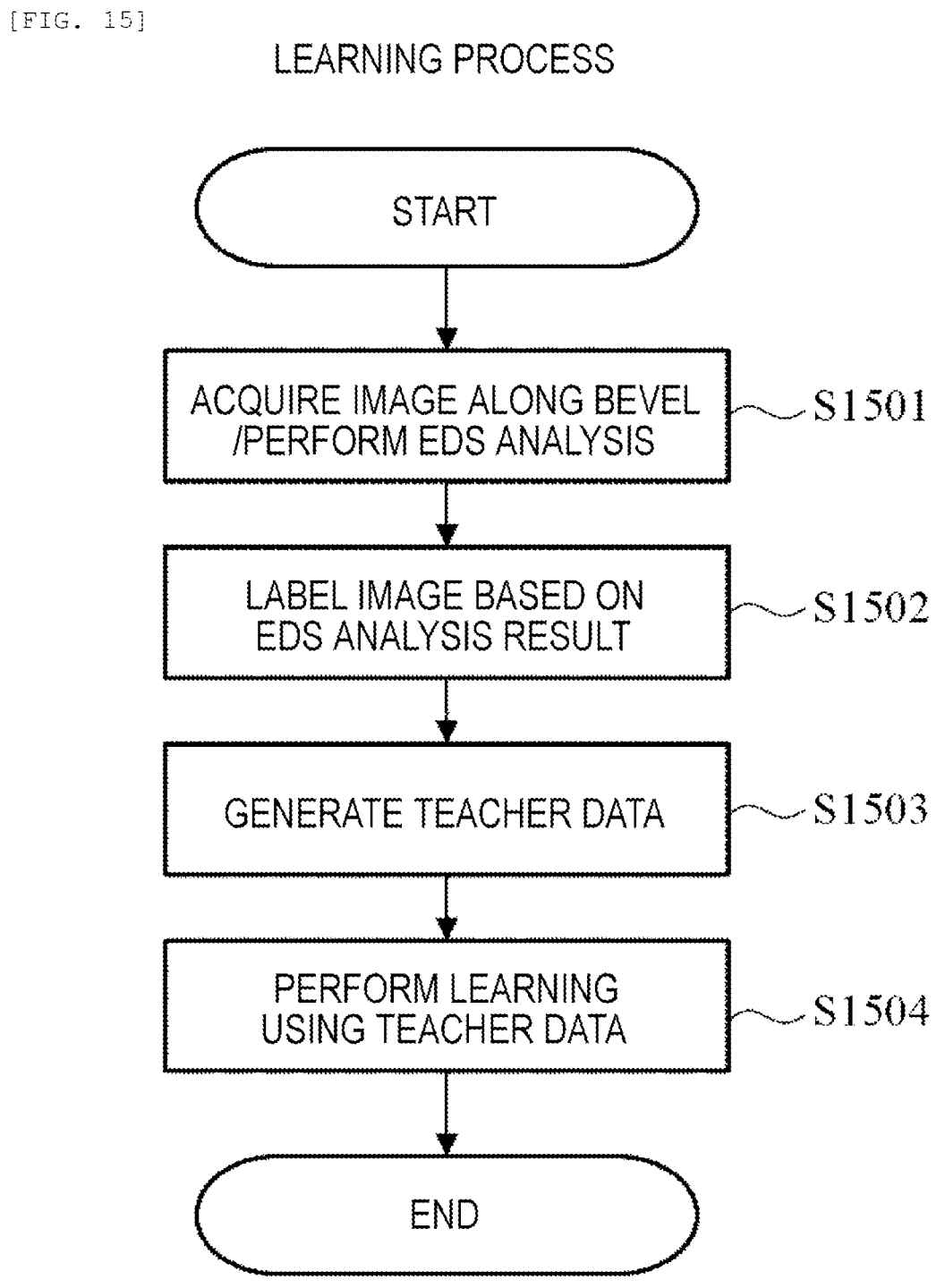

LEARNING PROCESS

```
        ┌─────────────────────┐
        │        START        │
        └─────────────────────┘
                   │
                   ▼
  ┌─────────────────────────────┐
  │  ACQUIRE IMAGE ALONG BEVEL  │──── S1501
  │    /PERFORM EDS ANALYSIS    │
  └─────────────────────────────┘
                   │
                   ▼
  ┌─────────────────────────────┐
  │      LABEL IMAGE BASED ON   │──── S1502
  │      EDS ANALYSIS RESULT    │
  └─────────────────────────────┘
                   │
                   ▼
  ┌─────────────────────────────┐
  │    GENERATE TEACHER DATA    │──── S1503
  └─────────────────────────────┘
                   │
                   ▼
  ┌─────────────────────────────┐
  │      PERFORM LEARNING       │──── S1504
  │     USING TEACHER DATA      │
  └─────────────────────────────┘
                   │
                   ▼
        ┌─────────────────────┐
        │         END         │
        └─────────────────────┘
```

[FIG. 16]
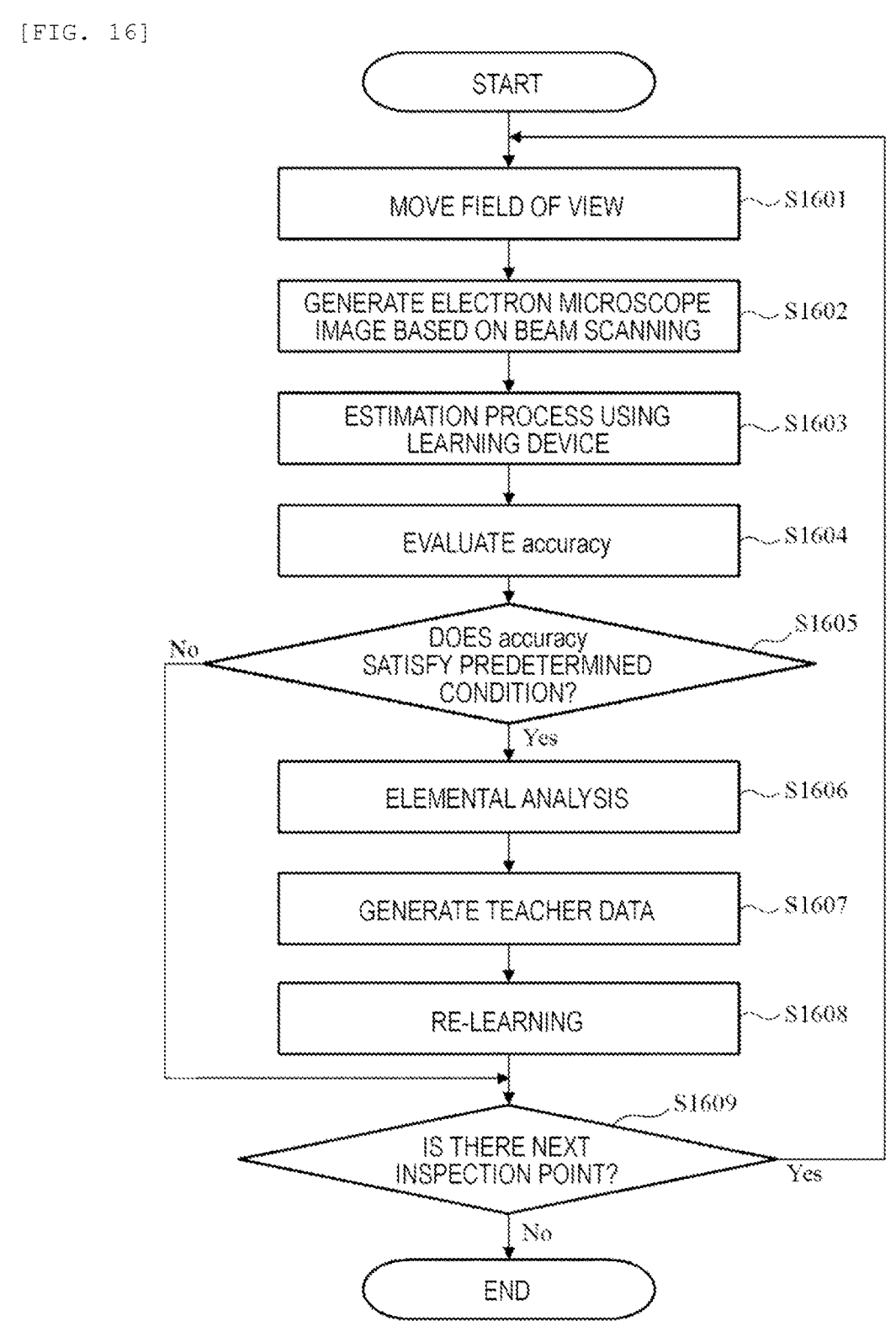

[FIG. 17]
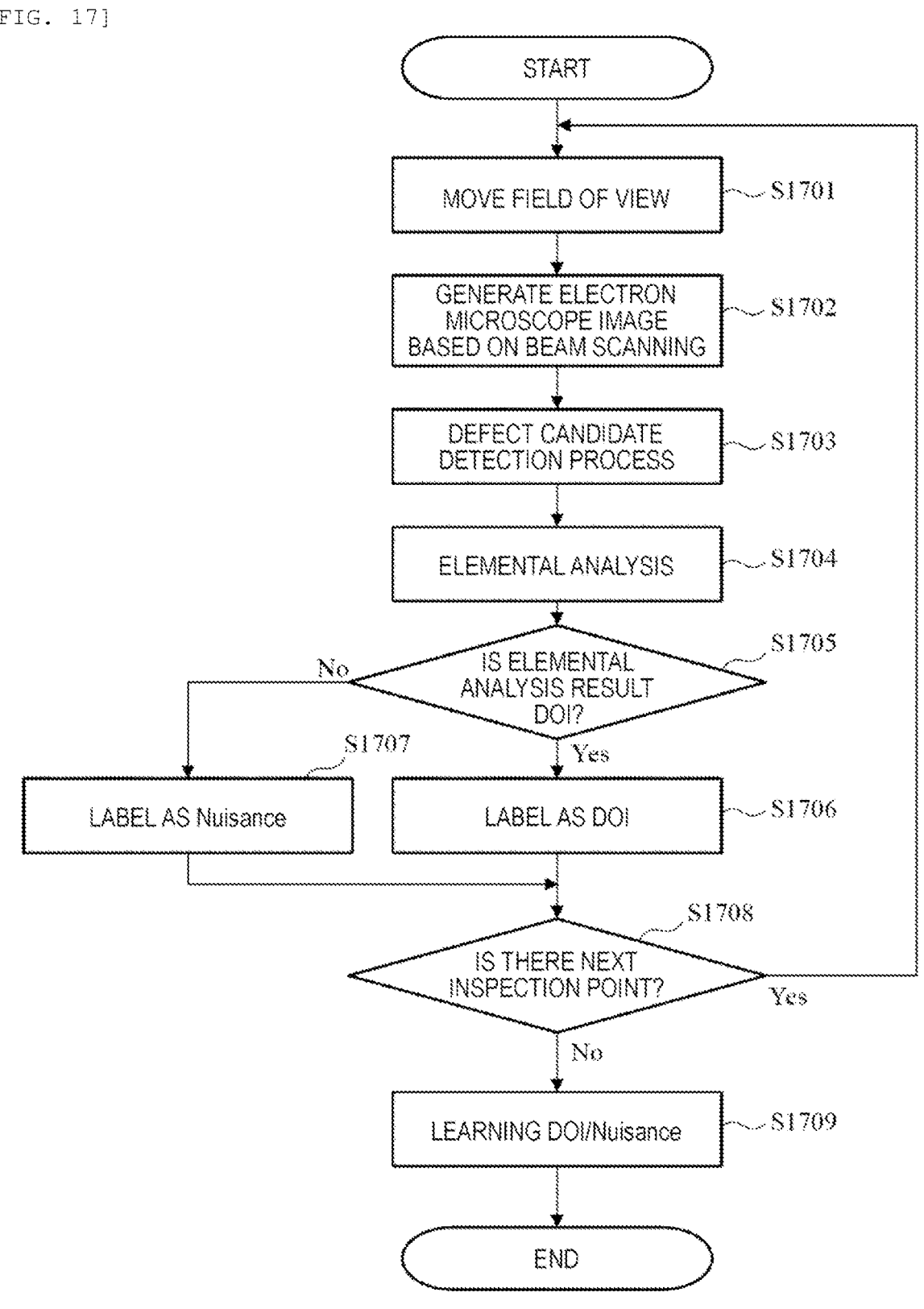

INSPECTION SYSTEM FOR DETECTING FOREIGN MATERIAL AND SCRATCH AT EDGE OF SEMICONDUCTOR WAFER AND NON-TRANSITORY COMPUTER-READABLE MEDIUM STORING A PROGRAM FOR SAME

TECHNICAL FIELD

The present disclosure relates to an inspection system and a non-temporary computer-readable medium and relates to, for example, a wafer inspection system for inspecting an outer peripheral portion of a wafer and a non-temporary computer-readable medium.

BACKGROUND ART

In semiconductor manufacturing, it is important in process management to grasp a state of an outer peripheral portion of a wafer. For example, U.S. Pat. No. 7,919,760 (PTL 1) discloses an apparatus including an electron microscope and a rotation stage (θ stage) and describes an inspection method for inspecting an outer peripheral portion of a wafer by irradiating the outer peripheral portion of the wafer with an electron beam. In addition, JP-B-5608208 (PTL 2) discloses an inspection apparatus including a beam column for irradiating an edge with a beam in addition to an electron beam column for irradiating a wafer surface with a beam in order to inspect the edge portion of the wafer.

CITATION LIST

Patent Literature

PTL 1: U.S. Pat. No. 7,919,760
PTL 2: JP-B-5608208

SUMMARY OF INVENTION

Technical Problem

As disclosed in PTL 2, in order to determine the presence or absence of a defect and the position of the defect, an image representing a normal (no defect) sample area is registered in advance as a reference image, and by comparing an image (inspection image) obtained by irradiating the edge portion with the beam with the reference image, a portion having a large difference is determined to be a defect.

However, the boundaries of the multilayer film stacked on the wafer are concentrated on a sloped surface (bevel) formed on the sidewall of the wafer, and the shape of the boundaries is not stable due to the peeling of films near the boundaries. Therefore, in some cases, an image suitable as a reference image may not be obtained. For example, when there is a difference in a foreign material or a portion (background) other than the defect between the reference image and the inspection image, the portion will be considered as a defect, and thus, it is difficult to acquire a reference image for detecting the defect from the bevel.

In addition, both PTLs 1 and 2 do not discuss the situation where the reference image includes the boundary of the multilayer film.

In view of such a situation, the present disclosure proposes a technique for detecting the foreign material or the defect on the bevel without using the reference image.

Solution to Problem

As one aspect for solving the above-mentioned problems, the present disclosure proposes an inspection system for detecting a foreign material adhering to or a scratch formed on a bevel at an edge of a semiconductor wafer from image data obtained by an image acquisition tool, including: a computer system; and an operation module executed by the computer system, in which the computer system includes a learning device that outputs information on the foreign material adhering to or the scratch formed on the bevel as a learning result, the learning device performs learning in advance by using the image data acquired by the image acquisition tool and the information on the foreign material or the scratch on the bevel included in the image data, and the operation module detects the foreign material or the scratch by inputting the image data obtained by the image acquisition tool to the learning device.

Further features relating to this disclosure will become apparent from the description of this specification and the accompanying drawings. In addition, the embodiments of the present disclosure are achieved and realized by components, various combinations of components, and the following detailed description, and the aspect of the appended claims.

It should be understood that the description herein is merely a typical example and is not intended to limit the scope of the claims or the application examples of the present disclosure in any senses.

Advantageous Effects of Invention

According to the above-mentioned configuration, it is possible to detect foreign materials and defects on a bevel without using a reference image or the like.

BRIEF DESCRIPTION OF DRAWINGS

FIG. 1 is a diagram illustrating an example of a defect observation system for a semiconductor wafer.

FIG. 2 is a diagram illustrating an example of a control unit and a storage unit constituting the defect observation system and is a schematic diagram of a configuration of an operation unit.

FIGS. 4A and 4B are diagrams illustrating an image capturing method by scan rotation.

FIG. 5 is a flowchart illustrating a defect inspection process.

FIG. 6 is a diagram illustrating a relationship between observation position coordinates and an observation position azimuth angle.

FIG. 7 is a diagram illustrating images before and after scan rotation angle adjustment.

FIG. 8 is a diagram illustrating an example of a scanning electron microscope image of a bevel portion of a semiconductor wafer.

FIG. 9 is a diagram illustrating an example of a bevel inspection system.

FIG. 10 is a diagram illustrating an example of a GUI (Graphical User Interface) screen for inputting conditions for generating teacher data.

FIG. 11 is a flowchart illustrating a learning process.

FIG. 12 is a diagram illustrating an example of a GUI screen for inputting conditions for generating teacher data.

FIG. 13 is a flowchart illustrating an estimation process using a learning model.

FIG. 14 is a diagram illustrating an example of an elemental information estimation system.

FIG. 15 is a flowchart illustrating a learning process for automatically executing a labeling process.

FIG. 16 is a flowchart illustrating a process of re-learning a learning device during an estimation processing process using the learning device.

FIG. 17 is a flowchart illustrating an example of improving a work efficiency of a learning process (processing) by automating a labeling work of DOI (Defect of Interest) and Nuisance using an elemental analysis result.

DESCRIPTION OF EMBODIMENTS

Figure 3A:
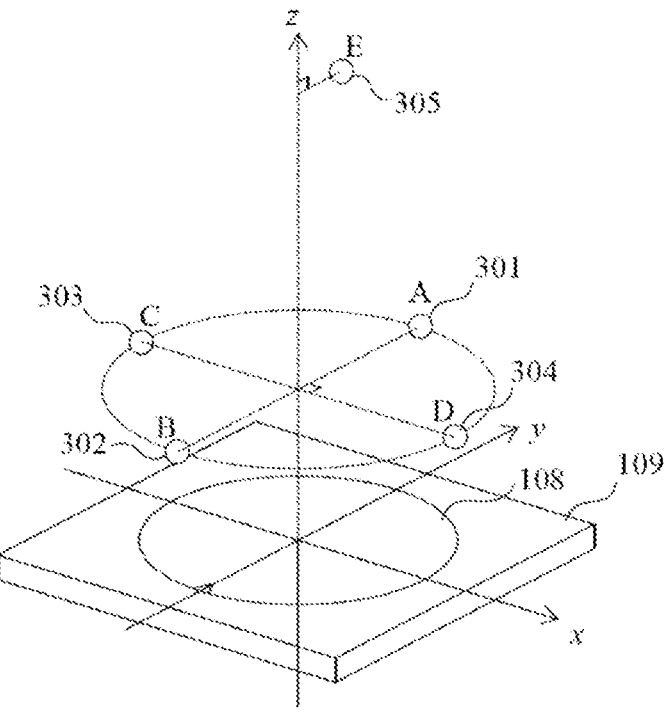
FIGS. 3A to 3C are diagrams illustrating a configuration of a detector of a defect inspection system.

Hereinafter, an embodiment of a wafer inspection system will be described with reference to the drawings. The objects, features, advantages, and ideas thereof of the present disclosure will be apparent to those skilled in the art by the description of the present specification, and although the description may be omitted or simplified as appropriate for the clarification, those skilled in the art can easily reproduce the present disclosure from the description of the present specification. The embodiments described below indicate preferred embodiments and are illustrated for the purpose of only exemplification or description, and the present disclosure is not limited thereto. Therefore, the present disclosure can be carried out in various other forms. It will be apparent to those skilled in the art that various modifications and changes can be made based on the description of the present specification within the intent and scope of the present disclosure disclosed herein.

In addition, in the following description, a process performed by executing a program may be described, but the program is executed by a processor (for example, CPU, GPU), and since predetermined processes are performed by using appropriate storage resources (for example, a memory) and/or an interface device (for example, a communication port), the subject of process may be a processor. Similarly, the subject of the process performed by executing the program may be a controller, an apparatus, a system, a computer, or a node having a processor. The subject of the process performed by executing the program may be an operation unit and may include a dedicated circuit (for example, FPGA or ASIC) that performs a specific process.

The program (module) may be installed in a device such as a computer from a program source. The program source may be, for example, a program distribution server or a computer-readable storage medium. When the program source is the program distribution server, the program distribution server includes a processor and a storage resource for storing the program to be distributed, and the processor of the program distribution server may distribute the program to be distributed to other computer. In addition, in the following description, two or more programs may be realized as one program, or one program may be realized as two or more programs.

(1) Wafer Inspection System

<Configuration of Wafer Inspection System>

The outline of the wafer inspection system will be described below using drawings. FIG. 1 is a diagram illustrating an outline of a scanning electron microscope 100, which is a type of image acquisition tool.

The scanning electronic microscope 100 illustrated in FIG. 1 includes an observation device 101 that images a wafer, a control unit 102 that performs the overall control, a storage unit 103 that stores information in a magnetic disk, a semiconductor memory, or the like, an operation unit (configurable by a processor or the like) 104 that performs operations according to a program, an external storage medium input/output unit 105 that performs inputting/outputting information to/from an external storage medium connected to the device, a user interface control unit (configurable by a processor or the like) 106 that controls inputting/outputting of information to/from a user, and a network interface unit 107 that communicates with a defect image classification device via a network.

In addition, an input/output terminal 113 configured with a keyboard, mouse, display, or the like is connected to the user interface control unit 106. The observation device 101 includes a movable stage 109 that can move in the XY direction for mounting a sample wafer 108, an electron source 110 for irradiating the sample wafer 108 with an electron beam as an imaging means, a detection device 111 that detects secondary electrons and backscattered electrons generated from the sample wafer, an electron lens (not illustrated) that converges the electron beam on the sample, and a deflector 112 that scans the electron beam on the sample wafer.

It is noted that, in the present embodiment, the scanning electron microscope 100 will be described as an example of the image acquisition tool, but the present invention is not limited thereto, and other image acquisition tools such as a focused ion beam device can also be adopted.

Furthermore, the scanning electron microscope 100 illustrated in FIG. 1 can be separately provided with a detector for the elemental analysis. For example, when using Energy Dispersive X-ray Spectrometry (EDS) for the elemental analysis, a detector that detects X-rays generated by receiving an electron beam irradiating the inspection target can be adopted. At this time, the control unit 102 controls ON/OFF of the X-ray detection. Then, the detected X-ray spectrum is spectrally analyzed in the operation unit 104, and information on the contained elements is extracted. It is also possible to use a TES (Transition Edge Sensor) type detector with high energy resolution as the X-ray detector.

<Example of Internal Configuration>

FIG. 2 is a diagram illustrating an example of an internal configuration of each of the control unit 102, the storage unit 103, and the operation unit 104.

The control unit 102 includes, for example, a stage control unit 201, an electron beam scan control unit 202, and a detector control unit 203. The stage control unit 201 controls the movement and stop of the stage. The electron beam scan control unit 202 controls the deflector 112 so that a predetermined field of view is irradiated with the electron beam. The detector control unit 203 samples a signal from the detection device 111 in synchronization with scanning of the electron beam, adjusts gain, offset, and the like to generate a digital image.

The storage unit 103 includes an image storage unit 204, a processing parameter storage unit 205, and an observation coordinate storage unit 206. The image storage unit 204 stores generated digital images together with additional information. The processing parameter storage unit 205 stores imaging conditions, defect detection processing parameters, classification processing parameters, and the like. The observation coordinate storage unit 206 stores, for example, the defect inspection coordinates of the observation target input by the user (operator).

The operation unit 104 includes an observation coordinate azimuth angle derivation unit 207, a defect detection unit 208, a defect image classification unit 209, and an image processing unit 210. The observation coordinate azimuth angle derivation unit 207 derives the azimuth angle of the observation coordinate viewed from the center of the wafer. The defect detection unit 208 detects the defect site from the image. The defect image classification unit 209 classifies the images according to the type of defect or the classification standard specified by the user. The image processing unit 210 performs image preprocessing such as smoothing and contrast adjustment and deformation such as image movement and rotation (image deformation means) or outputs the after-image-processing image to the image storage unit 204, the defect detection unit 208, and the user interface control unit 106 (image output means).

<Configuration Example of Detection Device>

Figure 3B:
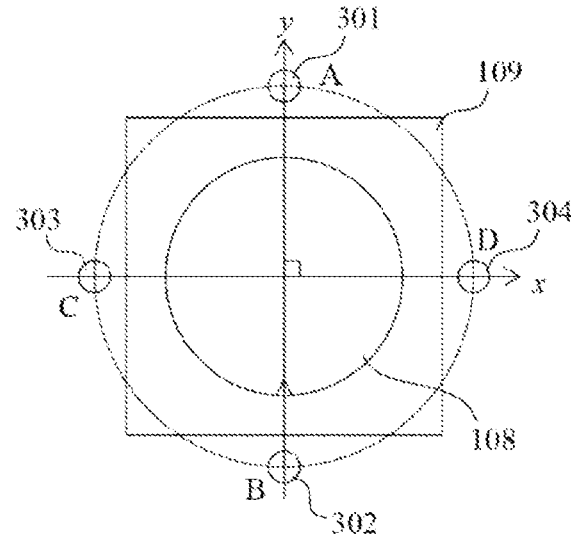
Figure 3C:
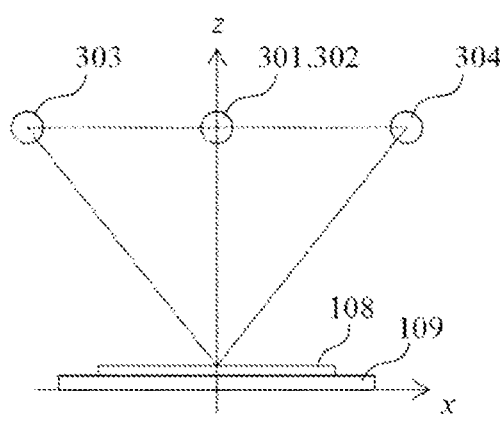

The configuration and arrangement of the detection device that detects secondary electrons and backscattered electrons generated from the sample wafer 108 are not particularly limited, and the configuration and number of electronic detectors included in the detection device are not particularly limited. Hereinafter, one embodiment of the detection device 111 illustrated in FIG. 3 will be described in detail. FIG. 3 is diagrams schematically illustrating a positional relationship between detectors 301 to 305 and the sample wafer 108. (A) of FIG. 3 is a projection drawing, and (B) and (C) of FIG. 3 are diagrams viewed from the z-axis and the y-axis, respectively (the detector 305 is not illustrated).

In FIG. 3, the detectors 301 to 304 are detectors configured to selectively detect the electrons with a particular emission angle (elevation angle and azimuth angle), and for example, the electrons emitted in the y direction from the sample wafer 108 is mainly detected by the detector 301. Accordingly, it is possible to acquire an image with contrast as when the light is applied from the detector direction. In addition, for example, the detector 305 is a detector that mainly detects secondary electrons emitted from the sample wafer 108.

<Defect Inspection>

Next, the outline of the defect inspection method will be described. The inspection method described herein includes an imaging step of imaging a plurality of sites including an edge of the semiconductor wafer while moving the semiconductor wafer in the XY directions on a plane, an output step of outputting an image in which the edge of the wafer is substantially parallel to each of the plurality of images obtained by imaging, and a defect detection step of detecting the defect of the semiconductor wafer in the output image.

FIG. 4 is diagrams illustrating a principle of capturing an image. The electron beam scan control unit 202 (refer to FIG. 2) controls the deflector 112 so that a predetermined imaging field of view is irradiated with the electron beam. Specifically, the electron beam scan control unit 202 controls the deflector 112 so that scanning in a certain direction in the imaging field of view is performed, then shifting in the perpendicular direction is performed, and the scanning is repeated again so that the entire imaging field of view is irradiated with an electron beam. At this time, the detector control unit 203 can obtain an image by digitally converting the signal detected by the detection device 111 in synchronization with the scanning of the electron beam by the deflector 112.

(A) of FIG. 4 schematically illustrates a state in which an electron beam is scanned for an imaging field of view 402 within a sample 401 and an obtained image 403. In addition, (B) of FIG. 4 schematically illustrates an example in which the imaging area is attached with an angle in the coordinate system (x, y) of the sample 401 by controlling the scanning direction of the electron beam, a state of scanning an area 404 with an angle R with respect to the sample 401, and an obtained image 405. The obtained image 405 is rotated with respect to the image 403. Hereinafter, capturing an image with an angle is referred to as scan rotation, and an angle R at that time is referred to as a scan rotation angle. In addition, the coordinate system of the sample is described as (x, y), and the coordinate system of the image is described as (u, v).

<Sample Observation Process of Edge Of Semiconductor Wafer>

Next, an example of an imaging process in which a plurality of sites including edges of the semiconductor wafer are imaged while moving the semiconductor wafer in the XY directions on a plane will be described with reference to FIG. 5. FIG. 5 is a flowchart illustrating details of a sample observation process according to the present embodiment.

First, the semiconductor wafer to be observed is installed on the stage (or the control unit 102 detects the installation of the semiconductor wafer on the stage 109 by the robot arm) (step 501), and the control unit 102 reads processing parameters corresponding to the target semiconductor wafer from the storage unit 205 (step 502). It is noted that the semiconductor is manufactured by a large number of manufacturing processes, and the appearance may be significantly different in each process, and features of the sample such as the ease of charging may also be different. For this reason, it is common to adjust and store the imaging conditions and the processing parameters for each process or device.

The control unit 102 reads a coordinate list (observation coordinates) of positions to be observed after or in parallel with reading the processing parameters from the storage unit 206 (step 503). The observation coordinate may be a defect coordinate output by another defect inspection device (not illustrated) or may be an input coordinate that the user desires to observe.

Next, the observation device 101 aligns the semiconductor wafer position in response to an instruction of the control unit 102 (step 504). The semiconductor wafer is provided on the stage 109 using a robot arm or the like, but at that time, a positional deviation or a rotational deviation of about several hundred microns occurs. Therefore, the operation unit 104 (which may be the control unit 102) captures an image of a unique pattern in which the edge portion and the position of the wafer are known, and then calculates an amount of misalignment by image processing. In addition to being able to correct the observation coordinates, it is also possible to correctly calculate the center coordinates of the wafer.

Next, the image of the defect site is acquired for the i-th observation coordinate, and the image is classified according to the type of defect or the classification standard specified by the user, and one embodiment of the procedure will be described below. First, the stage control unit 201 moves the stage 109 so that the target observation coordinate is within the field of view of the observation device 101 (step 505). At this time, in order to absorb the movement error of the stage 109, the stage position is measured, and the beam irradiation position is adjusted so as to cancel the movement error at the time of image acquisition.

Next, the electron beam scan control unit 202 rotates the scanning direction of the electron beam by controlling the deflector 112 so that the edges of the semiconductor wafer are parallel in a plurality of images (step 506). An example of the specific method is described. For example, the azimuth angle $\theta i$ of the observation coordinate seen from the center of the semiconductor wafer is derived. FIG. 6 is a diagram illustrating a straight line 603 connecting observation coordinates 601 and semiconductor wafer center coordinates 602, and an azimuth angle θ 604. An image 606 is a diagram illustrating an enlarged image of an area 605. According to this definition, the azimuth angle θi in the observation coordinates (dxi, dyi) with the center of the semiconductor wafer as an origin can be obtained by Equation 1.

$$\theta i = atan(dyi, dxi) \qquad \text{(Equation 1)}$$

It is noted that the function atan (y, x) is a function that returns an inverse tangent of y/x in a range of [−ρπ, π] radians, and a quadrant is appropriately obtained from an argument (y, x). In this embodiment, the azimuth angle θ is defined as an angle between the straight line 603 and the x-axis, but other definitions may be used as long as the rotation in the scanning direction can be defined. The azimuth angle operation of the observation coordinate is performed by the observation coordinate azimuth angle derivation unit 207 of the operation unit 104.

After deriving the azimuth angle θi, the control unit 102 determines the scan rotation angle Ri at the time of image capturing by the following Equation 2 and sets the scan rotation angle as an imaging parameter (step 507).

$$Ri = \theta i + \alpha \qquad \text{(Equation 2)}$$

α is a predetermined parameter and is predetermined so that the edges of the semiconductor wafer are almost parallel in a plurality of images. For example, when the parameter is set to −π/2 radians (−90 degrees), the background area can be adjusted to be located on the upper side of the image.

Subsequently, the detector control unit 203 scans the imaging field of view at the set scan rotation angle Ri and acquires an image (step 508). The area 607 of FIG. 6 is an area of a field of view for imaging the observation coordinate 601 and illustrates a state where a scan rotation angle R 608 is set. It is noted that, in deriving the azimuth angle θ and the scan rotation angle R, the database storing the azimuth angle θ or the scan rotation angle R may be referred to for each observation coordinate without performing the operation by Equations 1 and 2.

After image capturing (step 508), the defect detection unit 208 detects the defect site from the captured image (step 509) and classifies the defect image (step 510). Herein, a method for detecting the defect site will be described. FIG. 7 is a schematic diagram of images captured for five observation coordinates, images 701 to 705 illustrate images captured without scan rotation, and images 706 to 710 illustrate images captured d after setting the scan rotation angle. In addition, in each image, a black area represents an outer wafer area (background area) and a white area represents an inner wafer area. In the images of images 701 to 705, the positional relationship between the inner wafer area and the background area is different in each image, and for example, even in a case where the images 701 and 702 are aligned in the (u, v) direction, the slope of the area boundary is different, so that there is no suitable solution. Therefore, it is difficult to detect the defect by comparative inspection. On the other hand, the images 706 to 710 are captured with the scan rotation angle adjusted so that the background area is on the upper side of the image.

<Reason why Bevel Image is not Suitable for Reference Image>

As described above, by performing the scan rotation, the beam can be scanned in the same direction (direction perpendicular to the edge) as the edge direction regardless of the edge direction. However, in some cases, the image obtained by the beam scanning to the bevel may not be suitable as a reference image for comparative inspection. The reason is described in detail below.

FIG. 8 is a diagram illustrating a shape of the bevel and a state of the image acquired by the bevel. A bevel is a slope formed on a sidewall of the wafer. In recent years, semiconductor wafers have become multi-layered and have a structure in which a plurality of layers are layered. Since an end 801 of each layer is formed on the bevel, an image 802 obtained by scanning the beam to the bevel includes the end of the plurality of layers as illustrated in FIG. 8. In some cases, the shape of this end (boundary) often differs from place to place, and furthermore, film peeling or the like may occur according to the location.

That is, even in a case where there is no defect or foreign material, the edge shape included in the image differs according to the location, so that the image acquired herein is not suitable for the reference image used for the comparative inspection.

(2) Foreign Material Detection System

A system (an foreign material detection system 900) that enables detection of the foreign materials, the defects, and the like on the bevel without using the reference image, and a non-temporary computer-readable medium that stores a program executed by the computer system will be described.

FIG. 9 is a diagram illustrating a configuration example of the foreign material detection system 900 that detects the foreign materials and the like on the bevel. The system illustrated in FIG. 9 is configured with one or more computer systems. The inspection process described in this example may be performed by the operation unit 104 provided in the observation device 101 or may be performed by an external computer system communicably connected to the observation device 101. FIG. 9 is represented by a functional block diagram. A computer system 901 exemplified in FIG. 9 is a machine learning system which includes one or more processors and is configured so as to execute one or more operation modules (not illustrated) stored in a predetermined storage medium.

In addition, the estimation process as described later may be performed by using an AI accelerator. The computer system 901 illustrated in FIG. 9 is provided with an input unit 904 in which teacher data to be used for learning and data necessary for the estimation process are input from an SEM image storage unit (storage medium) 902 or an input/output device 903.

A learning device 905 built into the computer system 901 accepts at least one of the bevel image data input from the input unit 904, features of the image extracted by an image processing device (not illustrated) and the like, and a set of information (data set) related to the foreign materials or scratches on the bevel input from the input/output device 903 as teacher data.

A foreign material defect estimation unit 907 is learned by the learning device 905, reads the learning model stored in a learning model storage unit 906, and executes the estimation process using the learning model.

<Configuration Example of GUI for Inputting Conditions for Generating Teacher Data>

FIG. 10 is a diagram illustrating a configuration example of a GUI (Graphical User Interface) displayed on a display screen of the input/output device 903 when inputting conditions for generating teacher data.

A GUI screen illustrated in FIG. 10 includes an additional information display field 1001 for displaying information related to the image data input from the SEM image storage unit (storage medium) 902, an image display field 1002 for displaying an SEM image, and a setting field 1003 for setting the type of the foreign object or the defect as constituent areas.

The additional information display field 1001 displays the acquisition position (Location) of the SEM image, which is the additional information of the SEM image displayed in the image display field 1002, and the sampling number. It is noted that, in the example of FIG. 10, the azimuth angle described in FIG. 6 is displayed as the position information, but the x and y coordinates may be displayed.

The image display field 1002 displays a bevel image. The user (operator) can set the type of the foreign materials or the defects from the setting field 1003 by viewing the displayed bevel image.

In the setting field 1003, the foreign materials, the scratches, the peeling of the film, and the like on the bevel can be set. In addition, with respect to the foreign materials, it is possible to select whether the foreign material is a metallic foreign material or a non-metallic foreign material. When the user visually views the SEM image, in a case where it is empirically possible to distinguish between metal and non-metal, the setting field may be configured to enable selection based on the information. The reason is that the metallic material generated by EUV (Extra Ultra Violet) exposure may adhere to patterns generated in a subsequent process and cause element destruction due to conduction between the patterns. When such a metallic material is generated during the EUV exposure and is brought into the subsequent process in a state of being attached to the bevel portion, there is a possibility that this state may cause element destruction. Therefore, especially the inspection for the presence or absence of the metallic foreign materials is very important for improving the yield of the semiconductor device.

<Details of Learning Process>

FIG. 11 is a flowchart illustrating a learning process (processing) executed by the operation unit 104 or the computer system 901.

First, the observation device 101 acquires an image along the bevel (step 1101). The computer system 901 or the like displays the acquired image on the GUI screen as illustrated in FIG. 10. Then, while viewing the image displayed on the GUI screen, the user (operator) sets (labels) the type of the foreign materials or the defects contained in the image, and the input unit 904 acquires the labeled information (labeling) (step 1102). In the labeling process, for example, the defect type is specified by selecting the defect type in the setting field 1003 of the GUI screen illustrated in FIG. 10.

The learning device 905 and the like generate a learning model by using the specified defect type data and the image data, a data set of the image data of ROI (Region Of Interest) selected in the image data as teacher data (step 1103) and store the learning model in the learning model storage unit 906 (step 1104).

In the setting field 1003 of the GUI screen illustrated in FIG. 10, it is possible to set an unknown foreign material as the type of the foreign material. When an unknown foreign material is selected, it is considered that the EDS analysis is performed later in order to identify the element of the unknown foreign material and the teacher data is generated by using the information on the metal and non-metal identified by the EDS analysis. In the computer system 901, for example, a test recipe is generated based on a setting with an unknown foreign material and a position information at that time and stored in a predetermined storage medium, so that the teacher data based on accurate element identification can be generated.

In addition, when an unknown foreign material is selected on the GUI screen, an inspection recipe where the EDS analysis is selectively performed may be generated.

Furthermore, the setting field 1003 enables selection of the boundary of the film that is not a defect. The end 1004 of the film is displayed on the bevel portion, but the shape thereof is not constant. The fact that the end 1004 of the film is reflected in the image is a factor that makes comparative inspection difficult. However, since the end 1004 of the film is not a foreign material or a scratch, it is possible to improve the reliability of estimation by learning that this structure is normal.

It is noted that, in the GUI screen of FIG. 10, an example in which the ROI 1006 is set by the pointer 1005 moved by the operation of a pointing device or the like and the defect type within the ROI is set has been described, but as illustrated in FIG. 12, the labeling may be performed by classifying the image data itself. A GUI screen 1201 is provided with a left column 1205 in which a plurality of thumbnails 1204 in which a bevel image 1202 and additional information 1203 of the bevel image are set are displayed and a right column 1208 in which input fields 1206 and 1207 for each defect type are provided.

While viewing the bevel image 1202, the user (operator) determines the presence or absence of the foreign materials, the type of the foreign materials, the presence or absence of the scratches, the presence or absence of peeling of the film, and the like and can update the learning data by moving the thumbnails 1204 to the input field of the corresponding defect type in the right column 1208 by using a pointing device or the like. The input unit 904 generates a data set for inputting the bevel image 1202 included in the thumbnail 1204 and outputting the defect type of the input field in which the thumbnail 1204 is input and uses the data set as the teacher data of the learning device 905.

The presence or absence of the foreign material on the bevel can be determined by estimation using the learning model generated through the learning process described above. It is noted that the learning model may be prepared in units of a manufacturing process. The reason is that the number of boundaries (the number of multilayer films) included in the bevel portion differs according to the manufacturing process, so that, by preparing a model according to the manufacturing process (model according to the number of films), highly accurate estimation can be realized. In addition, high-precision estimation may be performed by using process information as input data in addition to the bevel image.

<Estimation Process of Foreign Materials, and the Like>

FIG. 13 is a flowchart illustrating an estimation process (processing) of a foreign material or the like using the generated learning model.

First, as illustrated in FIG. 8, an image is acquired along the bevel by using an observation device (scanning electron microscope) 101 (step 1301).

Next, the foreign material defect estimation unit 907 executes the estimation process by using the learning device 905 obtained in the learning step (step 1302). Specifically, the foreign material defect estimation unit 907 illustrated in FIG. 9 is learned by the learning device 905, reads the learning model stored in the learning model storage unit 906, and executes the estimation process using the learning model. The foreign material defect estimation unit 907 reads the learning model stored in association with the process information from the learning model storage unit 906 based on the process information input from the input/output device 903. Then, when the learning model using the process information as input data is used, the foreign material defect estimation unit 907 executes the estimation process by acquiring the input process information and the bevel image.

The foreign material defect estimation unit 907 outputs an estimation result to at least one of an estimation result storage unit 908 and the display device provided in the input/output device 903 (step 1303).

According to the computer system 901 as illustrated in FIG. 9, the foreign materials and the like on the bevel can be detected without using a reference image for comparative inspection. As the learning device, for example, a neural network, a regression tree, a Bayesian classifier, or the like can be used.

<Elemental Analysis System>

An elemental analysis system 1400 (refer to FIG. 14) including an EDS analyzer attached to the observation device (scanning electron microscope) 101 and one or more computer systems communicably connected to the EDS analyzer exemplified in FIG. 1 can perform map analysis (plane analysis) within the field of view of the scanning electron microscope. Specifically, the elemental analysis system 1400 divides the field of view into one or more predetermined pixels (unit areas) and by measuring the X-ray intensity of each pixel with an X-ray detector can obtain the element map data (Information of the distribution of elements).

The element map data is data including the information on the two-dimensional distribution of elements and includes the information on the two-dimensional positions (coordinates) and the X-ray intensity at each position. In addition, by converting the intensity of X-rays at each position into the concentration of the element at each position, it is possible to obtain element map data illustrating the position on the sample and the concentration of the element at each position. The element map data is obtained for each element.

As described above, the foreign materials adhering to the bevel may cause damage to the semiconductor device formed in a later process according to the material. On the other hand, element identification based on X-ray spectrum analysis requires a relative processing time with respect to the image formation based on the detection of secondary electrons and backscattered electrons. Therefore, the present embodiment proposes the elemental analysis system (defect inspection system) 1400 that can identify the foreign materials that may damage the semiconductor device in a short time.

FIG. 14 is a diagram illustrating a configuration example of the system (elemental analysis system) 1400 for deriving the element map data based on the image data obtained by the image acquisition tool. The elemental analysis system 1400 illustrated in FIG. 14 is a system that estimates at least one of the elements contained in the sample and the distribution of elements from the data obtained by the image acquisition tool (observation device (scanning electron microscope) 101). The elemental analysis system 1400 includes the computer system 901 and an operation module (not illustrated: for example, a module including the input unit 904, the learning device 905, and an element information estimation unit 1406) executed by the computer system 901. The computer system 901 includes the learning device 905 that outputs at least one of the elements and the distribution of elements contained in the sample wafer 108, and the learning device 905 performs the learning in advance by using the teacher data having the image obtained by the image acquisition tool as the input and having the information on at least one of the elements and the distribution of elements obtained by the elemental analysis system 1400 as the output. The operation module is a module that outputs at least one of the information on the element and the distribution of elements by inputting image data obtained by the image acquisition tool to the learning device 905.

The image formed based on the detection of charged particles (particularly, backscattered electrons) obtained by irradiation with a charged particle beam is inferior to the element map obtained by the EDS analyzer (X-ray analyzer 1405), but the element composition difference is expressed as a brightness difference (contrast). Furthermore, the image formed based on the detection of the charged particles can be acquired in a short time as compared with the X-ray spectrum analysis by the EDS analyzer. Therefore, by performing the estimation using the above-described learning device learned by using the teacher data having the image (or the feature extracted from the image) obtained based on the detection of charged particles as the input and having the information on the elements or element map obtained by an EDS analyzer or the like as the output, the element identification of the sample can be performed at a high speed.

In the system 1400 illustrated in FIG. 14, in the learning process (processing) of the learning model, the image data is generated by an image processing device 1403 based on the signal output from an electronic detector 1402, and the data to be input to the input unit 904 of the computer system 901 is generated by performing the EDS analysis on the X-rays detected by an X-ray detector 1404 by the X-ray analyzer 1405. Furthermore, the computer system 901 uses the learning device 905 to learn the image data and the data set of the X-ray analysis result as the teacher data.

In addition, in the estimation process (processing), the element information estimation unit 1406 estimates the element information from the input image data by using the learning model stored in the learning model storage unit 906. The element information is, for example, information on the contained element identified by the EDS analysis and the information on the distribution of elements.

According to the elemental analysis system 1400 having the above configuration and functions, it is possible to perform the elemental analysis at a high speed. In addition, by generating a learning model learned by the teacher data having the element map information and the SEM images (images formed based on the detection of the secondary electrons and the backscattered electrons) as the input and having the information on the elements of interest as the output and by inputting the element map information, the information on the elements, and the SEM images into the learning model, the labor involved in the labeling work during the learning can be simplified. By preparing such a learning model for the labeling, it is possible to automatically update the learning model without manually performing the labeling. Furthermore, it is possible to shorten the inspection time by using a system that selectively performs the EDS analysis according to the type of defect and foreign materials estimated based on the machine learning.

<Labeling Process>

FIG. 15 is a flowchart illustrating processing (labeling process) of automatically performing labeling.

Using the elemental analysis system 1400 as illustrated in FIG. 14, the field of view of the electron beam is located at a plurality of positions in the bevel portion, an electron microscope image is acquired, and EDS analysis is performed (step 1501).

The information on elements of the defect to be the DOI (Defect of Interest) is set in advance from the input/output device 903 and the like. Then, when the element to be the target of DOI is detected by the X-ray analyzer 1405, the input unit 905 labels the electron microscope image (step 1502).

The computer system 901 generates teacher data based on the labeled electron microscope image (step 1503), learns the learning device 905 by using the teacher data, and stores the generated learning model in the learning model storage unit 906 (step 1504).

By performing the estimation using the learning model generated as described above, it is possible to detect the DOI or the coordinates (field position) including the DOI without performing the X-ray analysis which takes a relatively long time. It is noted that labeling may be performed including not only the elements that can be DOI but also other elements that can be detected by the X-ray analyzer 1405.

Furthermore, the data set of the element map and the electron microscope image may be used as the teacher data. By generating the learning device that can estimate the element map, it is possible to specify the size and position of the DOI contained within the field of view.

In the case of performing the estimation using the learning device 905, the EDS analysis is selectively performed when the detection accuracy (accuracy) of DOI is low or when it is clearly estimated that the DOI is included (when the accuracy is high), so that it is possible to evaluate whether or not the estimation using the machine learning is performed appropriately. That is, for example, when the detection accuracy (accuracy) of the DOI is low (when the accuracy is lower than the first threshold value), there is a need for re-learning in order to improve the estimation accuracy by learning. In addition, when the detection accuracy (accuracy) of the DOI is high (when the accuracy is higher than the second threshold value (>first threshold value)), the re-learning can be performed in order to further improve the estimation accuracy by learning.

<Re-Learning Process>

FIG. 16 is a flowchart illustrating details of a re-learning process in which re-learning is performed as necessary during the estimation process using the learning device 905.

After the start, first, the electron beam scan control unit 202 moves the field of view so that the field of view of the electron microscope is located on the bevel (step 1601).

Next, the detector control unit 203 generates an image based on the beam scanning (step 1602) and inputs the image generated via the image processing device 1403 and the input unit 904 to the learning device 905.

Then, the element information estimation unit 1406 performs an estimation process of the foreign materials or the like (determination of the presence or absence of the foreign materials or the like) using the learning device 905 (step 1603). It is assumed that appropriate learning is performed on the learning device 905 used herein in advance.

In addition, the element information estimation unit 1406 evaluates an index value such as accuracy output from the learning device 905 at this time (step 1604). When the accuracy is equal to or larger (or higher) than the predetermined value (second threshold value), or when the accuracy is equal to or smaller (or lower) than the predetermined value (first threshold value (<second threshold value)) (Yes in step 1605), the process proceeds to step 1606. In addition, for example, when the index value is between the first threshold value and the second threshold value (No in step 1605), the process proceeds to step 1609.

In step 1606, the elemental analysis is performed by using the X-ray analyzer 1405 for additional learning. When the accuracy is high, the electron microscope image and the set of information on elements are considered to be suitable as teacher data. On the other hand, when the accuracy is low, it is considered that unknown foreign materials or defects are contained. By selectively performing the elemental analysis when certain conditions are satisfied, additional learning can be performed so that the learning device can estimate with higher reliability while suppressing the time required for the elemental analysis. Since the analysis by the elemental analyzer requires a considerable amount of time for the formation of the electron microscope image, according to the system that automatically executes the process illustrated in FIG. 16, appropriate re-learning for the learning device can be performed while suppressing an increase in the inspection time. It is noted that the learning device 905 is used to estimate a plurality of types of objects where the foreign materials, scratches, peeling of the film, the edges of the film, or the like may exist in the field of view, and when all the accuracies of these estimation targets are low, it may be determined that an unknown object is contained in the field of view, and the elemental analysis may be selectively performed.

Subsequently, the learning device 905 generates teacher data from the elemental analysis result (element name, element map, and the like) and the data set of the electron microscope image (step 1607) and performs re-learning the learning device 905 by using the generated teacher data (step 1608). As a predetermined condition related to the accuracy, for example, when a specific element (for example, a metal that affects a later process) is detected, the teacher data may be selectively generated. In addition, for example, in order to enable manual assist, a GUI screen as illustrated in FIG. 10 is displayed together with elemental analysis information, and teacher data is generated by selecting the foreign materials or the artifact types other than the foreign materials. By displaying the element map and the electron microscope image together on the display device (display screen of the input/output device 903) according to such a difference learning process, it is possible to identify artifacts other than critical foreign materials such as metallic foreign materials, and by using the data set of the artifact and defect type as teacher data, it is possible to generate the learning device 905 having an excellent ability to identify between critical metallic foreign materials and other artifacts.

With respect to a plurality of inspection points, according to a system programmed to automatically perform the process of repeating the processes in steps 1601 to 1608, it is possible to efficiently inspect foreign materials while improving the identification function of the learning device (step 1609→step 1601).

It is noted that, unlike the wafer surface, since the bevel portion is a sloped surface, the height may differ according to the position of the field of view. When the heights are different, the focusing conditions of the electron beam change according to the position of the field of view. Since the image quality will be different when the focusing condition changes, a plurality of models are prepared according to the positioning condition or the position information stored in relation to the height of the bevel portion, and the estimation process may be performed based on the selection of the learning model according to the focusing condition and the position information.

<Automation of Labeling>

FIG. 17 is a flowchart illustrating an example of improving a work efficiency of the learning process (processing) by automating a labeling work of DOI (Defect of Interest) and Nuisance using the elemental analysis result.

First, the electron beam scan control unit 202 moves the field of view so that the field of view of the observation device (electron microscope) 101 is located on the bevel (step 1701).

Next, the detector control unit 203 generates an image based on the beam scan (step 1702).

The defect detection unit 208 executes a defect candidate detection process (step 1703). The defect candidate detection process may be executed by using the learning device 905. When the learning device 905 is used, the defect candidate detection process is performed by inputting the acquired image to the learning device 905. When using the learning device 905, it is necessary to perform appropriate learning in advance. At this time, by limiting the defect candidates that require detailed analysis, the time required for the elemental analysis can be suppressed. The higher the learning accuracy, the more accurately the defect candidates can be limited, so that the time required for the elemental analysis can be suppressed.

Subsequently, the elemental analysis system 1400 executes the elemental analysis on the detected defect candidates (step 1704). Then, the elemental analysis system 1400 performs the labeling as DOI when the result of elemental analysis is DOI (step 1706) and performs the labeling as Nuisance when the result is Nuisance (step 1707). Since the coordinates and areas of the analyzed elements are contained in the elemental analysis results, the coordinates and areas can be automatically labeled on the SEM image by matching the coordinates and areas with the SEM image. By labeling by using the elemental analysis results, highly accurate and stable labeling results can be expected rather than the operator determining DOI/Nuisance based on experience based only on the SEM image.

The learning device 905 executes the learning by using the labeling results necessary for the learning (step 1709). As described above, by using the elemental analysis result, the labeling work in the learning process (processing) can be executed with high accuracy and automatically.

REFERENCE SIGNS LIST

101: observation device
102: control unit
103: storage unit
104: operation unit
105: external storage medium input/output unit
106: user interface control unit
107: network interface unit
108: sample wafer
109: movable stage
110: electron source
111: detection device
112: deflector
113: input/output terminal
201: stage control unit
202: electron beam scan control unit
203: detector control unit
204: image storage unit
205: processing parameter storage unit
206: observation coordinate storage unit
207: observation coordinate azimuth angle derivation unit
208: defect detection unit
209: defect image classification unit
210: image processing unit
301 to 305: detectors
401: sample
402: imaging field of view

16

403: image
404: area with an angle R
405: image
601: observation coordinate
602: semiconductor wafer center coordinates
603: straight line
604: azimuth angle
608: scan rotation angle
701 to 705: images captured without scan rotation
706 to 710: images captured after setting scan rotation angle
900: foreign material detection system
901: computer system
902: SEM image storage unit
903: input/output device
904: input unit
905: learning device
906: learning model storage unit
907: foreign material defect estimation unit
908: estimation result storage unit
1400: elemental analysis system
1402: electronic detector
1403: image processing device
1404: X-ray detector
1405: X-ray analyzer
1406: element information estimation unit

The invention claimed is:

1. An inspection system for detecting a foreign material adhering to or a scratch formed on a bevel at an edge of a semiconductor wafer from image data obtained by an image acquisition tool, comprising:

a computer system including a processor and memory storing a program executed by the processor, the program causing the processor to:

perform learning in advance by using the image data acquired by the image acquisition tool and the information on the foreign material or the scratch on the bevel included in the image data, and output information on the foreign material adhering to or the scratch formed on the bevel as a learning result, and detect the foreign material or the scratch based on the image data obtained by the image acquisition tool and the learning result, wherein the computer system detects the foreign material or the scratch by using a learning model according to a manufacturing process based on a number of films of the semiconductor wafer.

2. The inspection system according to claim 1, wherein the image acquisition tool is communicably connected to the computer system, and wherein the image acquisition tool includes:

an X-ray detector detecting X-rays emitted from a sample by irradiating the sample with a beam, and an X-ray analyzer classifying elements contained in the sample based on an output of the X-ray detector.

3. The inspection system according to claim 2, wherein the image acquisition tool selectively executes analysis using an X-ray analyzer according to a type of the foreign material or the scratch detected by the processor.

4. The inspection system according to claim 2, wherein the computer system receives the image data from the image acquisition tool, receives information on elements from the X-ray analyzer, and executes a labeling process using the received information on elements on the received image data.

5. The inspection system according to claim 1, wherein the processor performs learning by using teacher data including manufacturing process information of the semi-conductor wafer, and detects the foreign material or the scratch based on the manufacturing process information of a sample.

6. A non-transitory computer-readable medium for storing a computer program for causing a computer to execute a process of detecting a foreign material adhering to or a scratch formed on a bevel at an edge of a semiconductor wafer from image data obtained by an image acquisition tool, wherein the computer program executes:

a process of performing learning by using the image data acquired by the image acquisition tool and the information on the foreign material or the scratch on the bevel included in the image data, and outputting the information on the foreign material adhering to or the scratch formed on the bevel as a learning result; and a process of detecting the foreign material or the scratch in another image data obtained by the image acquisition tool by using the learning result, wherein the computer detects the foreign material or the scratch by using a learning model according to a manufacturing process based on a number of films of the semiconductor wafer.

* * * * *